United States Patent [19]

Files

[11] 4,005,672
[45] Feb. 1, 1977

[54] BUMPER WITH CUSHION PIVOT AT BOTTOM

[75] Inventor: James Harold Files, New Orleans, La.

[73] Assignee: Regal Tool & Rubber Co. Inc., Corsicana, Tex.

[22] Filed: Apr. 15, 1976

[21] Appl. No.: 677,447

[52] U.S. Cl. .................................. 114/219; 61/48
[51] Int. Cl.² ..................... B63B 59/02; E02B 3/22
[58] Field of Search ............... 114/219, 220; 61/48, 61/104; 403/225, 228, 234

[56] References Cited

UNITED STATES PATENTS

| | | | |
|---|---|---|---|
| 2,892,315 | 6/1959 | Blancato | 61/48 |
| 3,145,685 | 8/1964 | Kulick, Sr. | 61/48 |
| 3,564,858 | 2/1971 | Pogonowski | 114/219 |
| 3,718,326 | 2/1973 | Ristau | 114/219 |
| 3,873,076 | 3/1975 | Evans | 114/219 |

Primary Examiner—George E. A. Halvosa
Assistant Examiner—Gregory W. O'Connor
Attorney, Agent, or Firm—Richards, Harris and Medlock

[57] ABSTRACT

A bumper assembly for a marine structure where a vertical resiliently encased main cylinder is secured at the upper end to the marine structure by a releasable connection with the lower support for the main cylinder including an upstanding stab post extending into the bottom of the main cylinder and coaxially aligned with the upper end of the main cylinder. A resilient cylinder is positioned between the inside of the main cylinder and the outside of the stab post. Preferably the internal diameter of the resilient cylinder is slightly larger than the diameter of the stab post and provides a pivotal cushion at the bottom of the main cylinder to permit angular displacement of the main cylinder from the vertical position.

8 Claims, 3 Drawing Figures

BUMPER WITH CUSHION PIVOT AT BOTTOM

FIELD OF THE INVENTION

This invention relates to a bumper ring assembly, and more particularly relates to a resilient coupling to a stab post in a structure for supporting a resiliently encased main cylinder.

BACKGROUND OF THE INVENTION

Bumper fendering assemblies are commonly used to protect docks and off-shore platforms. Such assemblies employ a resiliently encased vertical cylinder which is mounted to a leg of the platform. Typically the cylinder is encased by a series of stacked resilient cylindrical rings. Heretofore general maintenance requirements for bumper fendering assemblies have been difficult and time consuming. For example, replacement of the cylindrical rings or vertical cylinder requires the removal of both ends of the vertical cylinder from the platform leg, replacement of damaged rings or cylinder and the reconnection of both ends of the cylinder.

SUMMARY OF THE INVENTION

In accordance with the present invention, a bumper assembly for a marine structure has a vertical resiliently encased main cylinder secured at the upper end to a marine structure by a releasable connection. The lower support of the main cylinder includes an upstanding stab post extending into the bottom of the main cylinder in coaxial alignment with the upper end of the main cylinder. A resilient cylinder preferably is secured to the inside of the main cylinder and has an internal diameter slightly larger than the diameter of the stab post, to form a cushion pivot which permits the angular displacement of the axis of the main cylinder from vertical to clear the upper releasable connection.

DESCRIPTION OF THE DRAWINGS

Novel features believed characteristic of the invention are set forth in the appended claims. The invention itself, however, as well as further advantages thereof, will best be understood by reference to the following detailed description of an illustrative embodiment taken in conjunction with the accompanying drawings, in which:

DESCRIPTION OF THE PREFERRED EMBODIMENT

Figure 1:
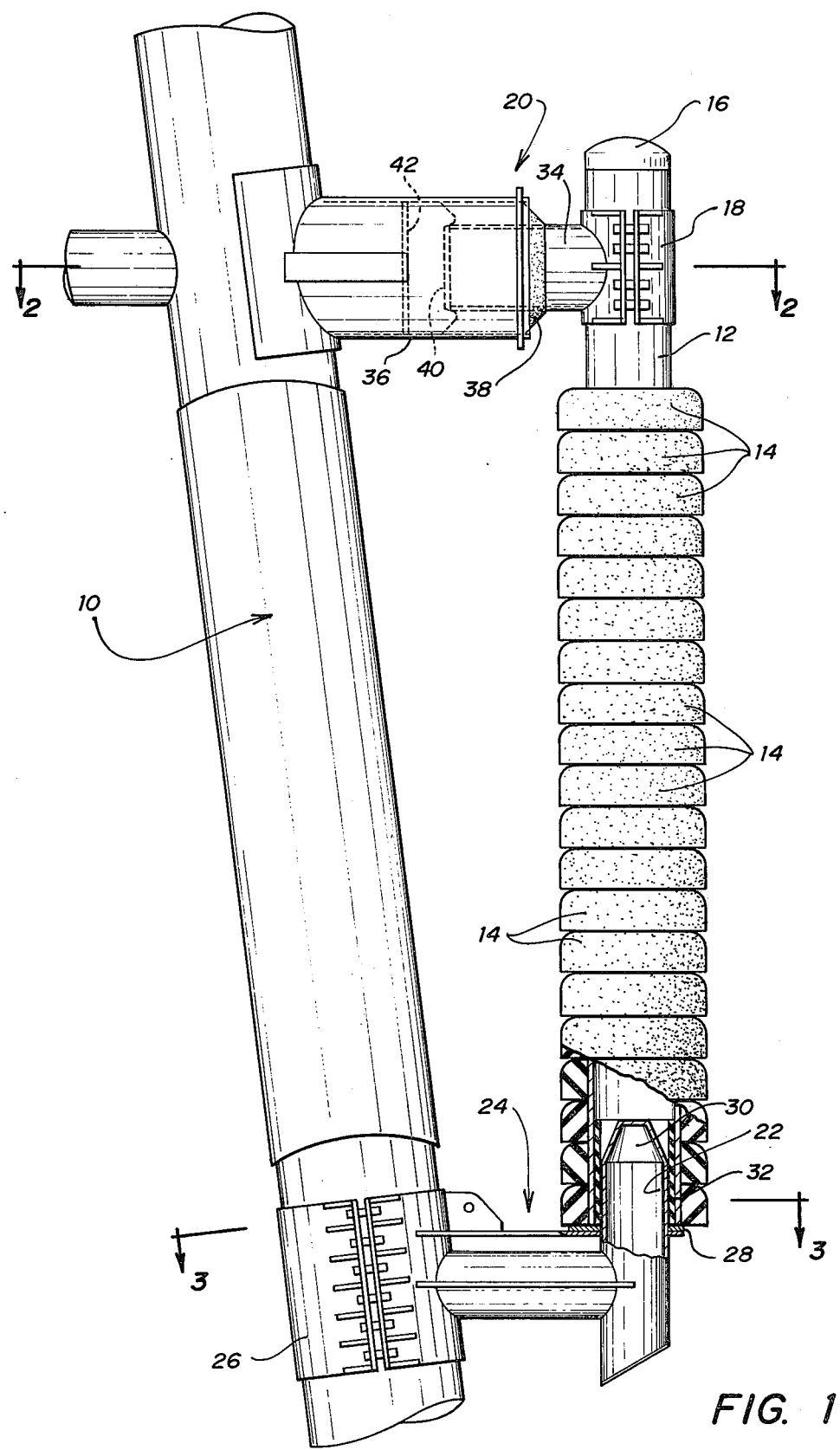
FIG. 1 is a side elevation view, partly in section, of the preferred embodiment of the present invention.
Figure 2:
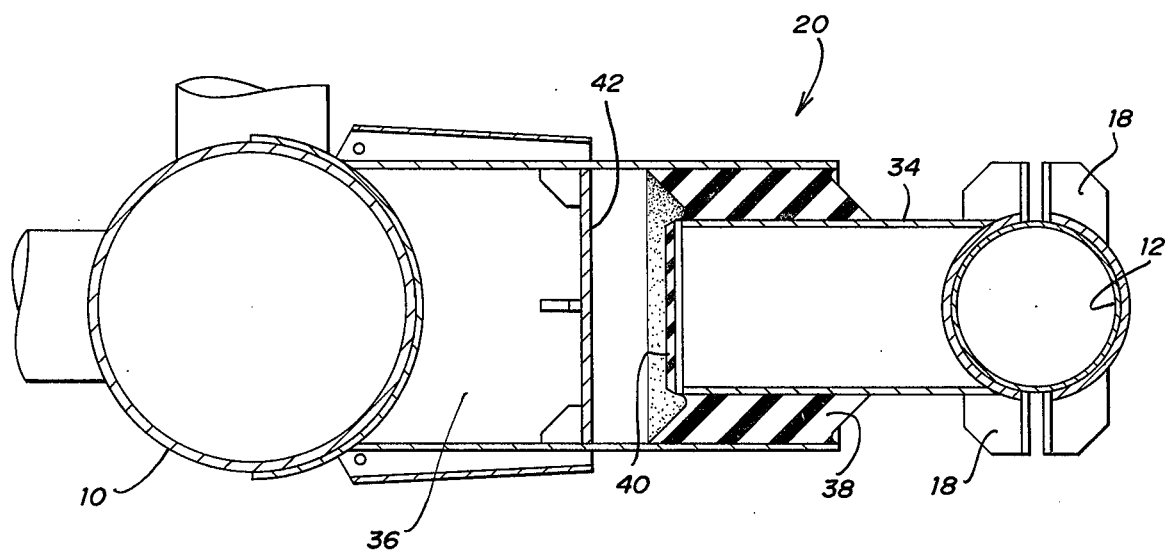
FIG. 2 is a sectional view taken generally along the sectional lines 2—2 of the present invention in FIG. 1.
Figure 3:
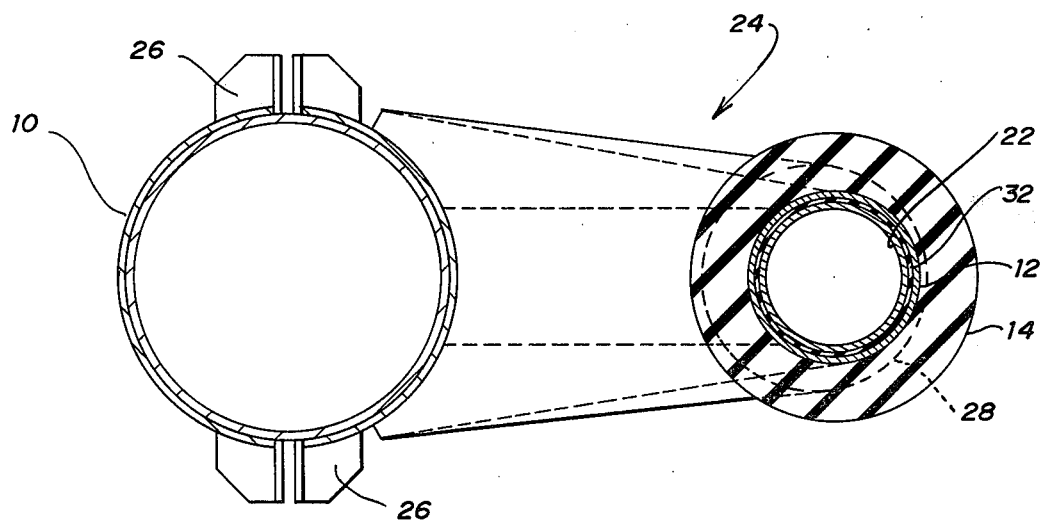
FIG. 3 is a sectional view taken generally along the section lines 3—3 of the present invention shown in FIG. 1.

Referring to FIGS. 1, 2 and 3, a platform leg 10 of an off-shore platform (not shown) supports a set of bumper rings 14. The bumper ring assembly includes a vertical main cylinder 12, which supports a stacked series of resilient cylindrical rings 14 surrounding the main cylinder 12. The rings 14 are loosely fitted to the main cylinder 12 so that the rings 14 can freely rotate on the main cylinder 12. The upper end of the main cylinder 12 is closed using a cap 16, and is interconnected through clamp 18 and the shock absorbing cell assembly 20 to the platform leg 10.

The lower end of the main cylinder 14 is supported by a stab post 22, which is supported by the platform leg 10 through supporting structure 24 and clamp 26. The series of stacked rings 14 are supported on a lower stop plate 28 on which the bottom-most ring 14 rests, the other rings being stacked thereabove.

The bottom end of the main cylinder 12 is open to receive a stab post 22 coaxially therein. Stab post 22 has an upper end 30, which is conically shaped. The conical shape facilitates locating and positioning the main cylinder 12 above and over the stab post 22. Alternatively, the upper end 30 of stab post 22 can be convex or spherically shaped.

The bottom portion of the lower end of main cylinder 12 further includes a cylindrical rubber liner 32 which has an inside diameter slightly larger than the outside diameter of the stab post 22. The cylindrical rubber liner 32 provides a cushion pivot at the lower end of the main cylinder 12, thereby permitting angular displacement of the axis of the main cylinder 12 from the vertical position.

The upper end of main cylinder 12 is mounted through clamp 18 to the shock cell 20. The shock cell 20 includes telescoping tubular members 34 and 36. Tubular member 36 is welded to the platform leg 10 and tubular member 34 is mounted to clamp 18. Clamp 18 can be easily unbolted to free the upper end of the main cylinder 12 from the shock cell 20. The shock cell 20 further includes an annular rubber cylinder 38 bonded to both tubular members 34 and 36 to absorb and dissipate not only axially directed shocks, but also shocks having components in other directions. The inner end of the tubular member 34 carries an elastomeric pad 40 which can strike an abutment 42 to limit its travel.

In operation to replace a damaged main cylinder 12, the main cylinder 12 is disconnected from the shock cell 20 by unclamping the clamp 18. After removing the series of rings 14, the main cylinder 12 can then be directly lifted above the stab post 122. Since there is no mechanical connection between the stab post 22 and main cylinder 12, only clamp 18 must be disconnected to facilitate replacement of the main cylinder 12. Upon replacement, the main cylinder 12 is easily positioned and located above stab post 22 using the conically shaped end 30 as a guide.

To replace worn or damaged bumper rings 14, clamp 18 is unclamped to permit the upper end of main cylinder 12 to move independent of the shock cell 20. The cushion pivot formed by lining 32 then permits the main cylinder to be tilted outward, away from the shock cell assembly 20 so that new rings may be slipped over the upper end of main cylinder 12. Bumper rings 14 can therefore be replaced quickly, in that only the upper end of main cylinder 12 needs to be disconnected. In addition, the cushion pivot formed by cylindrical liner 32 dampens the application of forces applied to the bumper ring assembly and transfers these forces to the support member 24 and to the platform leg 10. The cushion pivot also permits deflection inwardly of the main cylinder 12 should an inwardly directed force be applied at the upper end of the main cylinder 12.

Thus, in accordance with the present invention, the vertical main cylinder 12 is encased by a stack of resilient cylindrical rings 14 and is secured at the upper end of a platform leg 10 of a marine structure. The lower end of the main cylinder 12 is supported by an upstanding stab post 22 extending into the bottom of the main cylinder 12 and being coaxially aligned with the main cylinder 12. A resilient cylinder 32 is secured to the inside of main cylinder 12 and has an internal diameter slightly larger than the diameter of the stab post 22 thereby forming a cushion pivot to permit angular displacement of the axis to the main cylinder 12 from the vertical position.

Having described the invention in connection with certain specific embodiments thereof, it is to be understood that further modification may now suggest themselves to those skilled in the art and it is intended to cover such modifications as fall within the scope of the appended claims.

What is claimed is:

1. In a bumper assembly where a vertical main cylinder is secured at the upper end to a marine structure by a releasable connection, the combination comprising:
   a. a lower support for said main cylinder including an upstanding stab post extending into the bottom of said main cylinder in coaxial alignment with said upper end; and
   b. a resilient cylinder between said main cylinder and said stab post.

2. The combination of claim 1 wherein said stab post includes a conically shaped upper end.

3. The combination of claim 1 wherein said resilient cylinder comprises a cylindrical rubber liner secured to the bottom portion of the inside of said main cylinder, such that said liner contacts with the periphery of said stab post to provide a pivotal cushion at the bottom of said main cylinder.

4. The combination of claim 3 wherein the height of said cylindrical rubber liner is about equal to the distance said stab post extends into the bottom of said main cylinder.

5. In a bumper assembly where a vertical main cylinder is secured at the upper end to a marine structure by a releasable connection, the combination comprising:
   a. a lower support for said main cylinder secured to said marine structure including an upstanding stab post having a conically shaped upper end and extending into the bottom of said main cylinder, coaxially aligned with said upper end; and
   b. a resilient cylinder secured to the bottom portion of the inside of said main cylinder and of internal diameter slightly larger than the diameter of said stab post, such that said resilient cylinder contacts the periphery of said stab post to provide a pivotal cushion at the bottom of said main cylinder.

6. In a bumper assembly for a marine structure:
   a. a resiliently encased vertical main cylinder;
   b. means for securing the upper end of said main cylinder to said marine structure;
   c. a lower support for said main cylinder including an upstanding stab post extending into the bottom of said main cylinder, coaxially aligned with said upper end; and
   d. a resilient cylinder secured to the inside of said main cylinder and of internal diameter slightly larger than the diameter of said stab post.

7. The bumper assembly of claim 6 wherein said means for securing the upper end of said main cylinder comprises a releasable connection.

8. The bumper assembly of claim 6 wherein said resilient cylinder surrounds said stab post to provide a pivotal cushion at the bottom of said main cylinder.

* * * * *